3,523,786
METHOD OF OPERATING AND CONTROLLING
A ZINC BLAST FURNACE
Michael John Loosemore, New York, N.Y., and Jeremy William Bray, London, England, assignors to Metallurgical Processes Limited, Nassau, Bahamas, a corporation of the Bahamas and Imperial Smelting Corporation (N.S.C.) Limited, London, England, carrying on business together in the Bahamas under the name and style of Metallurgical Development Company
Filed July 5, 1967, Ser. No. 651,169
Claims priority, application Great Britain, July 5, 1966, 30,091/66
Int. Cl. C22b 19/20
U.S. Cl. 75—87       2 Claims

ABSTRACT OF THE DISCLOSURE

A method of improving the operating efficiency of a zinc/lead blast furnace, by controlling the ratio of zinc to carbon in the charge, and the preheat temperature of the air blast according to the continually monitored values of (i) the said zinc/carbon ratio,
(ii) the said blast preheat temperature,
(iii) the ratio of slag-forming materials to carbon in the charge,
(iv) the composition of the furnace gas,
(v) the zinc content of slag, and
(vi) the temperature of the molten slag leaving the furnace.

---

Figure 1:
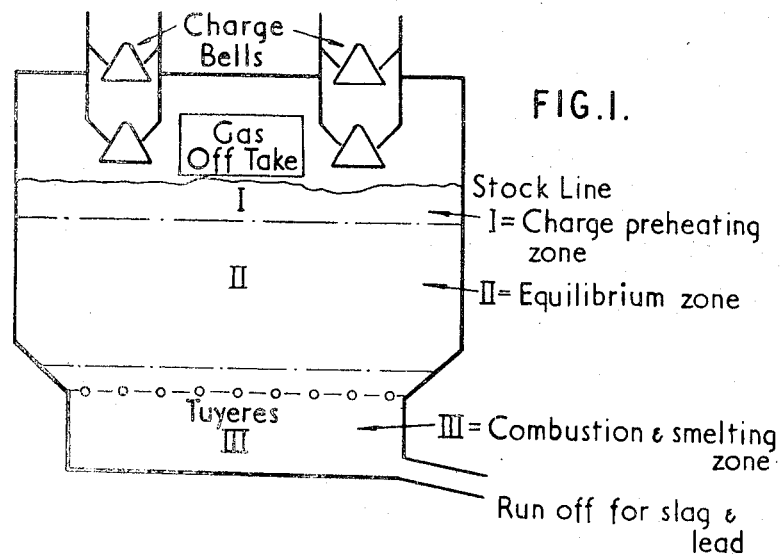

This invention relates to a method of improving the operating efficiency of a zinc-lead blast furnace, into which are charged metallurgical coke and a sinter containing zinc oxide and lead oxide, preheated oxygen-containing gas being blown in through tuyeres near the bottom of the furnace, while below these tuyeres molten lead and slag are run off, usually at intervals but possibly continuously, the zinc oxide in the charge being mostly reduced to zinc vapour, which, together with the permanent gases generated (consisting mostly of carbon monoxide, carbon dioxide and nitrogen), is conducted through an offtake (or offtakes) above the furnace stockline to a condenser (or condensers), where it is condensed, usually by being brought into contact with a shower of molten lead.

The improved operating efficiency of a zinc-lead blast furnace is attained, according to the invention, by an improved method of controlling the relative amounts and temperatures of the charge materials and oxygen-containing gas introduced into the furnace, the control measures taken involving the interpretation of the current furnace performance in the light of a model representing the important underlying physico-chemical factors. One feature of the invention is that, although any complete description of the chemical reactions occurring in the shaft must be very complex, our physico-chemical studies have determined which of these are important and what are their important characteristics. By this means we have developed a model that is adequate for representing furnace performance and that can be translated into mathematical form suitable for handling in a computer.

The important reactions occurring in the furnace shaft are as follows. Firstly, combustion of carbonaceous fuel at the tuyeres yields mostly carbon monoxide together with some carbon dioxide by the exothermic reactions:

$$C + \tfrac{1}{2}O_2 = CO \tag{A}$$

$$CO + \tfrac{1}{2}O_2 = CO_2 \tag{B}$$

Some of the carbon monoxide reduces zinc oxide to produce zinc vapour by the endothermic reactions:

$$ZnO + CO = Zn + CO_2 \tag{C}$$

Somewhat higher up in the shaft some of the carbon dioxide generated in reactions (B) and (C) reacts with carbon in coke to form carbon monoxide, by the endothermic reaction:

$$C + CO_2 = 2CO \tag{D}$$

Party in the zone where reaction (D) occurs, but mostly in the top zone of the furnace, where the sinter (which is normally charged cold when taken from storage but which may be at a higher temperature when conveyed direct from the sinter plant) and the carbonaceous fuel (normally charged at about 800° C.) become heated by the upcoming gases, some zinc oxide is regenerated on the surface of the descending charge by the exothermic reversal of reaction (C):

$$Zn + CO_2 = ZnO + CO \tag{E}$$

Also near the top of the furnace charge, lead oxide is reduced by carbon monoxide.

$$PbO + CO = Pb + CO_2 \tag{F}$$

One feature of the physico-chemical model is that the furnace operation is basically dependent on rates of heat and mass transfer and on the rate of reaction (D), the other reactions (the reactions (C), (E) and (F)) being so rapid that their rates are essentially determined by rates of mass transfer. As a consequence there is an equilibrium zone in the furnace where the gas and solid are at substantially the same temperature and where there is chemical equilibrium between gas and solid with respect to reaction (C) and (E).

In one aspect the invention consists in a method of improving the operating efficiency of a zinc-lead blast furnace, by controlling the ratio of zinc to carbon in the charge, and the preheat temperature of the oxygen containing blast according to the continually monitored values of (i) said zinc/carbon ratio, (ii) said blast preheat temperature, (iii) the ratio of slag-forming materials to carbon in the charge, (iv) the composition of the furnace gas, (v) the zinc content of slag, and (vi) the temperature of the molten slag leaving the furnace.

Figure 2:
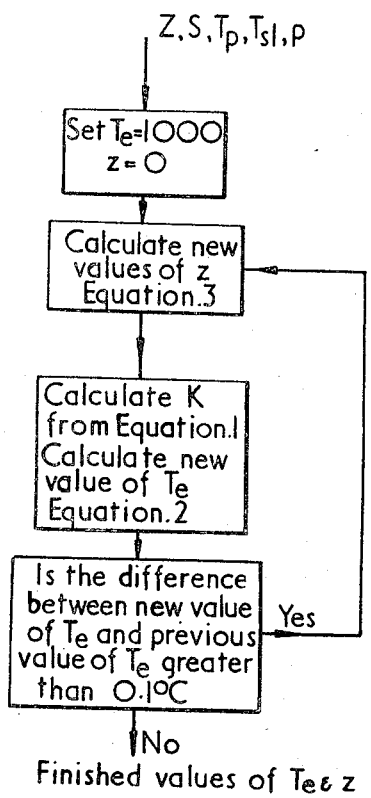
Figure 3:
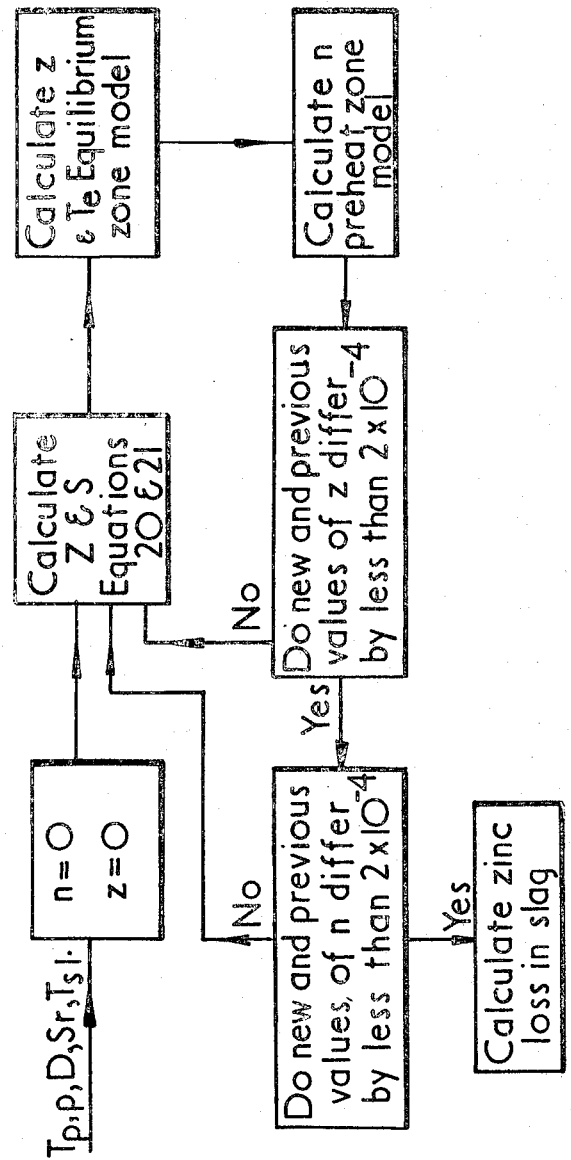

The invention will be further described with reference to the accompanying drawings, in which:

FIG. 1 is a diagrammatic cross-section of a blast furnace according to the invention.
FIG. 2 is a computer flow diagram,
FIG. 3 is a flow diagram of computer calculations.

The fundamental purpose behind the equations to be developed, is to be able to predict the effect on output at future points in time, of changes in operating conditions. This model will first be developed in a static form and then adapted to give the dynamic response of the plant.

The output of the shaft can be measured by a combination of any two of the following functions:

(a) The rate of input of zinc to the furnace,
(b) The rate of output of zinc in gas,
(c) The rate of output of zinc in slag.

The performance is measured entirely in terms of zinc smelting; this is because the level of lead used has little effect on the performance of the furnace as a zinc smelter. Normally, the amount of lead fed to the furnace is between ⅓ and ½ the zinc feed, on a weight for weight basis.

Of the three functions named above, the rate of output of zinc in gas is extremely difficult to measure on a short term basis and hence output will be measured in terms of zinc input and zinc loss.

FORMULATION OF THE STATIC MODEL

The operation of a zinc/lead blast furnace shaft is basically dependent on thermodynamic considerations, rates of heat and mass transfer and the rate of reaction (D) above. The rates of the other reactions are sufficiently rapid to be considered as instantaneous. It has been shown that, over a considerable length of the furnace, the gas and solid are at thermal and chemical equilibrium (Zone LI, FIG. 1).

The chemical equilibrium for zinc reduction is defined by:

$$K = \frac{[P.CO_2][P.Zn]}{[P.CO] a Zn.O_s}$$

where
P refers to partial pressures, and
K is a function of temperature.

The activity of zinc oxide solid ($aZnO_s$) will be assumed to be unity.

Within the equilibrium zone, the endothermic reaction of carbon with carbon dioxide occurs (reaction D) and the equilibrium is maintained by rapid oxidation of zinc by carbon dioxide which is an exothermic reaction. Above the equilibrium zone preheating of the charge, to equilibrium temperature, takes place by a combination of gas cooling and zinc reoxidation, the proportion of each being governed by the relative rates of heat and mass transfer. This preheating zone is shown as Zone I in FIG. 1. It is assumed that the relationship between the rate of heat and mass transfer is governed by the Chilton Colburn Analogy and that radiant heat can be neglected. As some of the charge preheating is performed by cooling of the gas, the gas leaves the charge in a non-equilibrium condition, and, to prevent excessive deposition of zinc oxide in the gas offtakes, the gas is reheated by adding air above the charge. This reacts exothermically with carbon monoxide in the gas.

In view of the presence of the equilibrium zone, it is convenient to divide the furnace at the top of the equilibrium zone and treat the two sections separately.

(a) The equilibrium smelting zone (Zones II and III, FIG. 1)

The inputs to this zone are:

(i) Oxygen-containing gas at preheat tempertaure $T_p$
(ii) Charge at equilibrium temperature $T_e$ The outputs are:

(i) Gas at equilibrium temperature $T_e$
(ii) Slag at temperature $T_{sl}$

If the zone is considered in isolation from the rest of the furnace, the overall reaction in the zone can be written as:

$$RN_2 + (1+p)C + \tfrac{1}{2}O_2 + zZnO \rightarrow$$
$$zZn + (z-p)CO_2 + (1+2p-z)CO + RN_2$$

where $z$ is the number of mols of zinc smelted per atom of oxygen in blast and $(p+1)$ is the number of mols of carbon burnt per atom of oxygen in blast and R is the value of inerts to oxygen in the blast gas assumed to be 1–881 in the following calculations, i.e. the value for air. Assuming the activity of zinc oxide is unity the equilibrium is defined by:

$$K = [z(z-p)] / [(1+2p-z)(2.881+p+z)] \quad (1)$$

where K the equilibrium constant is related to the equilibrium temperature ($T_e$) by the equation $$RT_k \ln K = -47{,}345 + T_k(51.23 - 2.92 \ln T_k) \quad (2)$$

where $T_k = T_e + 273.3$.

Equation 2 contains the value of the free energy, at temperature $T_k$, for the reaction $ZnO + CO \rightarrow Zn + CO_2$.

A further equation can be formed from a heat balance over the whole zone. Inserting the appropriate heats of reaction at temperature $T_e$, the sensible heat terms for heating blast from temperature $T_p$ to $T_e$ and the solid sinter slag from $T_e$ to $T_{sl}$, together with the latent heat of melting of slag, gives the equation:

$$z(42{,}220 + 10.17T_e - 13.02T_{sl}) = 21{,}750 + 1.37T_e$$
$$- p(42{,}370 - 2.09T_e) - Z(13.02T_{sl} - 13.13T_e + 4322)$$
$$- S(0.2440T_{sl} - 0.2607T_e + 126.4) - (T_e - T_p)$$
$$(16.75 + 1.21 \times 10^{-3}(T_e + T_p))$$

where

Z = mols of zinc oxide entering the equilibrium zone per atom of oxygen in blast
S = lbs. of slag material entering the equilibrium zone per lb. atom of oxygen in blast.

This equation assumes a heat loss of 4 kilocalories per lb. atom of oxygen in blast.

Equations 1, 2 and 3 can be solved for $z$ and $T_e$ if the values of Z, S, $p$, $T_p$ and $T_{sl}$ are known. This calculation was carried out on an Elliot 503 computer and the computer flow diagram is shown in FIG. 2.

For calculating the new value of $T_e$, Equation 2 is re-arranged in the form $$T_e(\text{new}) = 47{,}345 / [51.23 - R \ln K$$
$$- 2.92 \ln (T_e(\text{old}) + 273.3)] \quad (4)$$

This calculation was found to be rapidly convergent, four iterations being sufficient under all conditions. If the process is reversed, i.e. Equation 3 used to calculate $T_e$ and Equations 1 and 2 to calculate $z$, the method is divergent. The value of $T_e$ lies between 950° C. and 1150° C. and its value depends mainly on the levels of $T_p$ and $p$.

(b) The charge preheating zone

The equations for this zone are as follows:

$$dT_g/dx = -h(T_g - T_s) \quad (5)$$
$$dp_i/dx - hDi \ln [(1-P_1)/(1-p_1)] \quad (6)$$
$$Hs(dT_s/dx) = H_g(dT_g/dx) + H_t dy/dx \quad (7)$$
$$P_1 = (z-y)/(2.881 + p + z - y) \quad (8)$$
$$P_2 = (1 + 2p - z + y)/(2.881 + p + z - y) \quad (9)$$
$$P_3 = (z - p - y)/(2.881 + p + z - y) \quad (10)$$
$$[(1-P_1)/(1-p_1)]^{0.81} = [(1-P_3)/(1-p_3)]^{0.81}$$
$$= [(1+P_2)/(1+p_2)] \quad (11)$$
$$K = P_1 P_3 / P_2 \quad (12)$$

where $p_1$, $p_2$ and $p_3$ are the partial pressures of zinc, carbon monoxide and carbon dioxide in the bulk of the gas phase and $P_1$, $P_2$ and $P_3$ are the same partial pressures at the solid surface, $T_g$ is the gas temperature, $T_s$ is the solid temperature, $x$ is the distance measured up the furnace from the top of the equilibrium zone, $y$ is the number of lb. moles of zinc oxidised per lb. atom of oxygen in blast, from $x=0$ to $x=x'$ is the value at the stock line, and $D_i$ is the relative diffusivity of zinc where $D_i$ is given by

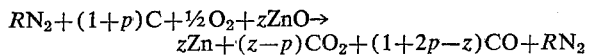

$$D_i = 0.81 / [0.81(p_1 + p_3) + 1.0(p_2 + P_{N_2})] \quad (13)$$

Equations 5 and 6 give the rates of heat and mass transfer respectively in the zone; the connecting constant ($h$) between the two equations involves the Chilton Colburn Analogy. (This assumes the Lewis $N_0$ is unity and the partial pressure of inert gas remains sensibly constant.) Equation 7 defines a heat balance over the length $dx$ where $H_s$ is the heat capacity of the charge, $Hg$ is the heat capacity of the gas and $H_t$ the heat of the reaction, at temperature $T_s$, of the reaction $Zn + CO_2 \rightarrow ZnO + CO$. Equation 11 is a mass balance for the gas constituents at the solid surface and, like Equation 13, it assumes that the diffusivities of zinc vapour and carbon dioxide are approximately 0.81 times the diffusivities of carbon monoxide and nitrogen. Since the reaction between zinc and carbon dioxide is fast the gas at the surface of the solid will be at equilibrium; this is shown in Equation 12 where $$R(T_s + 273.3) \ln K = -47{,}345 + (T_s + 273.3)$$
$$(51.23 - 2.92 \ln(T_s + 273.3))$$

This assumes that the oxidation reaction takes place on the solid surface only (i.e. the reaction is heteropolar). Differentiating Equation 8 and re-arranging Equations 5, 6 and 7 gives:

$$dy/dT_s = [H_s - H_g(dT_g/dT_s)]H_T \quad (14)$$

$$dy/dT_s = H_s/[H_T - (H_g(2.881+p)(T_g-T_s)/(D_1U(2.881+p+z-y)^2))] \quad (15)$$

where $U = \ln[(1-P_1)/(1-p_1)]$ is given by the solution of the equation $$[(2.881+p+z-y) - e^u(2.881+p)]$$
$$[(2.881+p+z-y) - e^u(2.881+2p)] = K[(3.881+3p)e^{0.81u} - (2.881+p+z-y)][2.881+p+z-y] \quad (16)$$

These differential equations have the following boundary conditions $$T_g = T_s = T_e, \ y=0 \text{ initial}$$
$$T_g = T_f \text{ final}$$

where $T_f$ is the solid temperature at the top of the charge. The total amount of zinc reoxidised over the whole zone ($n$) is given by $$n = \int_{T_s=T_e}^{T_s=T_f} (dy/dT_s)dT_s \text{ mols per atom oxygen in blast}$$

For computer solution of the equations, it was found convenient to re-write Equation 16 in the form $$U = \ln C2$$
$$\therefore dU/dC2 = [1/C2] \quad (17)$$

$$dC2/dK = -[(3.881+3p)C2^{0.81} - C1]/$$
$$[C1(5.762+3p) - C2(5.762+4p)(2.881+p) + 0.81KC1C2^{-0.19}(3.881+3p)] \quad (18)$$

where $C1 = 2.881+p+z-y$.

$$dK/dT_s = K(23851.4/(T_s+273.3)^2 + 1.471/(T_s+273.3)) \quad (19)$$

Since the initial value of $T_s = T_e$ the initial value of K will be that calculated for the equilibrium zone. Hence $$C2 \text{ (initial)} = 1, \text{ and } U \text{ (initial)} = 0$$

The final solid temperature is the mean temperature of sinter at 15° C. and coke at 800° C. However, the combustion of top air above the charge gives rise to radiation from the gas above the charge on to the top of charge thus altering the value of $T_f$. In the calculation carried out it was decided to ignore this radiation. It was felt that this would not affect the form of the polynomial though it might give rise to errors in the coefficients calculated theoretically (when the model is used to control the furnace, only the form of the polynomial obtained from theoretical considerations will be used, the coefficients being obtained by regression of plant data).

Equations 14, 15, 17, 18 and 19 were solved by a simple iterative process. The solid temperature range ($T_e - T_f$) was divided into a number of steps $\Delta T_s$ and, starting with $T_s = T_e$ and knowing the value $p$, $z$ and $K$(initial) values of $\Delta K$, $\Delta C2$, $\Delta U$, $\Delta T_g$ and $\Delta y$ were calculated and hence new values of $T_g$, $T_s$, $y$, $K$, $U$ and $C2$ obtained. This is repeated until $T_s = T_f$ when $y = n$. The value of $T_s$ is then halved and a second iteration carried out to find a new values of $n$. Further iterations were then carried out (halving $\Delta T_s$ each time) until $n$ remains constant to within $\pm 1.0 \times 10^{-4}$. The method is fairly rapidly convergent, the number of iterations varying between 2 and 5 depending on the initial values of $z$ and $p$. The initial number of steps was 16 in each case, i.e. $(T_s-T_f)/16$ for the first iteration.

(c) The model of the whole furnace shaft

The two sections of the model can now be combined to provide an overall relationship for the shaft. The inputs to the model are D, Sr, $T_p$, $p$ and $T_{sl}$ where D is the ratio of zinc to carbon in the charge (wt./wt.) and Sr the ratio of slag forming material to carbon in the charge (wt./wt.). The output to be predicted, for profit calculations, is the zinc loss in slag. From D and Sr the values of Z and S which are inputs to the equilibrium and smelting zone model can be calculated using the formulae $$Z = 12.01D(p+1)/65.38 + n \quad (20)$$

$$S = 12.01Sr(p+1) \quad (21)$$

Because of the dependence of Z on $n$, a further iterative process, for the model as a whole, must be used. The flow diagram of the computer calculations is shown in FIG. 3.

This calculation is rapidly convergent, requiring only 3 or 4 iterations to obtain $z$ and $n$ to the required degree of accuracy. From $z$ and $n$, the value of the zinc loses in slag per unit of carbon charged (wt./wt.), L, can be calculated using the formula $$L = D - 5.444(z-n)/(p+1) \quad (22)$$

with $z$ and $n$ accurate to $2.0 \times 10^{-4}$, the value of L is accurate to $\pm 0.001$. Using an Elliot 503 computer, programmed in the standard computer language Algol, each determination of L takes approximately 5 seconds.

As the model equations are too complex to transcribe into polynomial form by analytical means, values of L for a factorial design of $p$ $T_p$ and D, at 3 levels of Sr and 2 levels of $T_{sl}$, were calculated and regression analysis used to determine the form of the polynomial which fits the results. Graphs of some of these calculated values of L are shown in FIGS. 4 to 9 at $Sr=0.80$ and $T_{sl}=1100°$ C.

The best fit polynomial was found to be of the form $$L = a_0 + a_1p + a_2T_p + a_3D + a_4pT_p + a_5p^2 \quad (23)$$

If ZW is the loss of zinc in slag per unit of zinc input, as a weight percentage, the equation for ZW is of the form $$ZW = a_0 + F(a_1p + a_2T_p + a_3 + a_4pT_p + a_5p^2) \quad (24)$$

where $F = 1/D$.

Typical values for the constants, at $Sr=0.80$ and $T_{sl}=1300°$ C. are given in Equation 25 below $$ZW = 125.5 + F(263.8p - 0.1721T_p + 0.237T_pp - 908.3p^2 - 54.32) \quad (25)$$

With L accurate to $\pm 0.001$, ZW is accurate to approximately 0.1% absolute.

(d) The carbon burning rate

The variable $p$, in the above equations for ZW, is not in itself an independent but is representative of the carbon burning rate per unit of air. This is dependent on the factors, (a) The proportion of CO and $CO_2$ produced in the combustion and smelting zone (Zone III)
(b) The amount of carbon gasification reaction in the equilibrium zone (Zone II).

At our present state of knowledge, exact mathematical equations for the first condition cannot be formulated. However, equations for the rate of carbon gasification are known and values are available for the kinetic constants. For the case where the carbonaceous fuel is metallurgical coke, it has been shown that the rate of the reaction

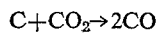

can be expressed by the general equation $$R_1 = K_1PCO_2/[1 + K_2PCO + K_3PCO_2] \quad (26)$$

where $R_1$ is the rate, in lb. mols per minute per atmosphere pressure per lb. of carbon. It has been shown by Richards and Tandy that the rate is independent of gas velocity (over a certain maximum velocity) and that the rate equation can be simplified, with little loss of accuracy, to $$R_1 = K_1PCO_2/[1 + K_2PCO] \quad (27)$$

where the values of $K_1$ and $K_2$ are given by:

$$K_1 = 3.56 \times 10^3 \exp(-4.24 \times 10^4/RT_k) \quad (28)$$
$$K_2 = 3.35 \times 10^{-8} \exp(4.68 \times 10^4/RT_k) \quad (29)$$

where $T_k$ is the absolute temperature and R is gas constant. These values are for powdered coke, the value of $K_1$ for lump being approximately half this value.

$$\log K_1 = 3.250 - 0.921 \times 10^4 (1/T_k) \quad (30)$$
$$\log K_2 = 7.475 + 1.036 \times 10^4 (1/T_k) \quad (31)$$

These values of $K_1$ and $K_2$ were obtained from the experimental data.

In a slice of equilibrium zone thickness $dx$ ft. and area A sq. ft., the weight of carbon is $100A dx / (2.222D + 3.444)$ lbs. and hence, for a blast rate of V cubic feet per minute, the differential equation for $p$ is given by $$dp/dx = -(2.48 \times 10^4 R.A.) / ((1 + 0.645D)V) \quad (32)$$

where $R_1$ is given by Equation 26 and $x$ is measured down the furnace.

As $p$ decreases down the furnace the values of $z$ and $T_e$ must also change to maintain chemical and thermal equilibrium. To maintain thermal equilibrium the following equation must hold $$(dp/dx)H_1 + (dz/dx)H_2 + (dT_e/dx)(Hg + Hs) = 0 \quad (33)$$

where $H_1$ is the heat of the reaction $$C + CO_2 \rightarrow 2CO = +42{,}367 - 2.09 T_e$$

$H_2$ is the heat of the reaction $$ZnO + CO \rightarrow Zn + CO_2 = +46{,}542 - 2.96 T_e$$

and $Hg$ and $Hs$ are the heat capacities of the gas and solid (per atom oxygen in blast).

To maintain chemical equilibrium Equations 1 and 2 must hold. Differentiation and substitution gives $$(dT_e/dx)(2385.4/(T_e+273.3)^2 - 1.471/(T_e+273.3))$$
$$= (dz/dx)(1/z + 1/(z-p) + 1/(1+2p-z)$$
$$- 1/(2.881+p+z)) - dp/dx (1/(z-p)$$
$$+ 1/(2.881+p+z) + 2/(1+2p-z)) \quad (34)$$

To maintain a mass balance for zinc, with counter current flow, the following relationship must exist $$dz/dx = dZ/dx \quad (35)$$

Using Equations 33, 34 and 35 values of $dz/dx$, $dT_e/dx$ and $dZ/dx$ can be calculated from $dp/dx$.

The initial conditions, for these differential equations are the values $T_e$, $p$, $z$, $Z$ and $S$ at the top of the equilibrium zone which are those calculated in the determination of $zw$. The final condition is $x = l_e$ where $l_e$ is the length of the equilibrium zone. For positive values of $p$, a method similar to that used for the charge preheating zone is adequate for solution of these differential equations. However, for negative values of $p$, the rate of convergence is very slow and a great improvement was found if, for each step in $x$ (delta $x$), the equations were solved using Gills adaptation of the Runge-Kutta equations. To be consistent this method was used throughout.

Since it is the value of $p$ at the top of the equilibrium zone ($pT$) which is the variable to be predicted, values of $pT$ were chosen to give a factorial design of $p$ at the bottom of the equilibrium zone ($pB$). For each value of $pB$, values of $pT$ were obtained for a factorial design of $T_p$ and D. This obviously required a certain amount of trial and error since, although $pT$ was the initial condition for the solution, $pb$ was the variable which was being set to a target value. This was particularly difficult at negative values of $pT$ when small changes in $pT$ made large changes in $pB$. The relationship between $pT$ and D was similar to that between $pT$ and $T_p$ except that the change of $pT$ with D is too small to show up clearly on a graph.

It can be seen that the form of the relationship between $pT$ and $pB$ is asymptotic.

$$pB \rightarrow +00 \, pT \rightarrow pB^2, \text{ and as } pB \rightarrow -0.5$$

$pT$ tends to a constant dependent on $T_p$ and D ($-0.5$ is the minimum possible value of $pB$ and corresponds to combustion to pure $CO_2$). The curves are best fitted by polynomials containing terms of the form $T_p$, D, $pB$ and $1/(pB+0.5)$ and regression analysis showed that a good fit was obtained with an equation of the form:

$$pT = a_0 + a_1 pB + a_2/(pB+0.5) a_3 T_p$$
$$+ a_4 pB^2 + a_5/(pB+0.5)^2 + a_6 T_p pB$$
$$+ a_7 T_p/(pB+0.5) + a_8 D \quad (36)$$

Typical values of these constants are given by the equation:

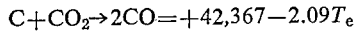
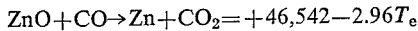

$$pT = 0.248 + 0.619 pB - 0.156/(pB+0.5) + 2.21 * 10^{-4}$$
$$T_p \neq 2.78 pB^2 + 1.3 * 10^{-2}/(pB+0.5)^2 - 9.32 * 10^{-4}$$
$$T_p pB - 5.94 * 10^{-5}/(pB+0.5) - 2.03 * 10^{-2} D \quad (37)$$

These constants are for $l = 14$ ft., $A/V = 0.0165$ min. ft.$^{-1}$, $Sr = 1.00$, $T_{sl} = 1100°$ C. The relationship between $pT$, $T_p$ and D is of the form:

$$pT = a_0 \mp a_1 T_p + a_2 D \quad (38)$$

and it will be assumed that the relationship between $pB$, $T_p$ and D is also of this form. Substituting this relationship into Equation 36 and expanding by the binomial expansion gives the equation:

$$pT = b_0 + b_1 T_p + b_2 (1/F) + b_3 T_p^2$$
$$+ b_4 (1/F)^2 + b_5 T_p (1/F) \quad (39)$$

where $D = 1/F$ and $pT$ is equivalent to $p$ in Equation 23 (the equation for predicting zinc loss in slag).

THE PROFIT FUNCTION

The profit function to be used is a gross function based on raw material inputs and product outputs. It does not include charges for overheads, wages, power and engineering services. It is only concerned with the two major products, i.e. zinc and lead, though it may be necessary, at a later date, to refine the function to include minor constituents such as copper, cadmium and the precious metals. Full derivation of this function will not be given only the final form, which is:

$$PF = 3.764 * 10^{-4} D(p+1)[(L_1 E * 10^{-2} + PL_2 R * 10^{-2}$$
$$- EL_6 * 10^{-2} - L_8 P(pp+R) * 10^{-2} - 100 M/Zs)$$
$$- zw(L_1 E * 10^{-4} + L_6 * 10^{-2} - L_6 E * 10^{-4})$$
$$- 10^2 C/D(100-f)] \quad (40)$$

where

PF is the profit in £ per hour per unit blast rate
E = condensation efficiency percent. (It is probable that this constant would be periodically (say weekly) up dated, since from suitable measurements it can be calculated. It would be quite simple to calculate E, say daily, and then at longer periods, say weekly, an overall value to be taken and the computer memory updated correspondingly.)
R = recovery of lead in bullion percent
P = ratio of lead/zinc in sinter
$pp$ = loss of lead in slag and cast zinc
$Zs$ = percent zinc content of sinter
$zw$ = percent of zinc input lost in slag
D = ratio of zinc to carbon in charge (tons per ton) = $1/F$
$f$ = percent ash in coke
$L_1$ = value of zinc produced £/ton zinc
$L_2$ = value of lead produced £/ton lead
$L_6$ = cost of zinc in sinter £/ton zinc
$L_3$ = cost of lead in sinter £/ton lead
M = cost of sintering £/ton sinter
C = cost of coke £/ton coke
$(p+1)$ = carbon burnt mols/atom of oxygen in blast This formula can be simplified to:

$$PF = (p+1)[\overline{A} - \overline{B} zw]/F - \overline{C}] \quad (41)$$

where $\overline{A}$, $\overline{B}$ and $\overline{C}$ are constants which change at infrequent intervals, Optimisation is carried by predicting, in the future, values of $p$ and $zw$ and hence PF, for various levels of F and $T_p$ using Equations 23 and 36, in which the coefficients are constantly updated using plant data (1).

A hill climbing technique is used to determine the levels of D and $T_p$ which give the maximum value to the average of four values of PF predicted at different times in the future. This optimisation is subject to certain constraints on both the levels of the independent variables and the zinc loss in slag.

MAKING THE MODEL DYNAMIC

For accurate prediction of the performance of the furnace, the predicting equations must include terms which allow for the dynamic behaviour of the plant. Including all the individual past values of the plant variables would lead to a very large computing system, so weighted averages of independent variable terms are used. In predicting the value of a dependent, previous values of that dependent are not explicitly used, i.e. actual values are predicted, not changes in value. Although, in some cases, prediction of change can give greater accuracy, it results in the need for greatly increased computer systems to predict and optimise in the future.

We claim:

1. In a method of improving the operating efficiency of a zinc producing blast furnace wherein a charge of carbonaceous reducing agent and oxidic zinciferous material is introduced into the top of the furnace to provide a continuous column therein; a blast of preheated oxygen-containing gas is blown into the bottom of the furnace; carbon monoxide gas is formed by the reaction of the carbon with oxygen; oxidic zinc and other oxidic metals present in the charge are reduced by the carbon monoxide and the resulting zinc is volatilized; a zone of chemical and thermal equilibrium is produced and maintained in the column where gas and charge are substantially at the same temperature; the oxidic zinc in the equilibrium zone is in chemical equilibrium with the gases with respect to the reduction reaction $ZnO + CO \rightleftarrows Zn$ (gas) $+ CO$, a gaseous mixture containing zinc vapor, carbon monoxide, carbon dioxide and nitrogen is formed during the reduction reaction and is withdrawn from the upper regions of the furnace for separate recovery of zinc; and the resulting molten slag is withdrawn from the bottom of the furnace, the improvement residing in the controlling of both the ratio of zinc to carbon in the charge and the preheat temperature of the oxygen-containing blast by the steps of continually monitoring the values of (1) said zinc/carbon ratio,
(2) said blast preheat temperature,
(3) the ratio of slag forming materials to carbon in the charge,
(4) said composition of the gaseous mixture withdrawn from the top of the furnace,
(5) the zinc content of the slag, and
(6) the temperature of the molten slag leaving the furnace;

converting said continually monitored values into electrical signals; feeding said electrical signals into a computer which, in accordance with the following relationship to maximize profitability, determines the amount by which said zinc/carbon ratio and blast preheat temperature are to be altered $$PF = 3.764 \times 10^{-4} D(p+1)[(L_1 E \times 10^{-2} + PL_2 R \times 10^{-2} - EL_6 \times 10^{-2} - L_8 P(pp+R) \times 10^{-2} - 100M/Zs) - zw(L_1 E \times 10^{-4} + L_6 \times 10^{-2} - L_6 E \times 10^{-4}) - 10^2 C/D(100-f)]$$

in which formula

PF is the profit in £/hr. per unit blast rate,
E is the condensation efficiency percent,
R is the recovery of lead in bullion percent,
$pp$ is loss of lead in slag and cast zinc (percent of lead in sinter input),
$p$ is the ratio lead/zinc in sinter,
$Zs$ is the percent zinc content of sinter,
$zw$ is the percent of zinc input lost in the slag,
D is the ratio zinc to carbon in the charge (tons per ton) $= 1/F$,
$f$ is the percent ash in coke,
$L_1$ is the value of zinc produced £/ton zinc,
$L_2$ is the value of lead produced £/ton lead,
$L_6$ is the cost of zinc in sinter £/ton zinc,
$L_8$ is the cost of lead in sinter £/ton lead,
M is the cost of sintering £/ton sinter,
C is the cost of coke £/ton coke, and
$(p+1) =$ carbon burnt mols/atom of oxygen in blast and altering said zinc/carbon ratio and blast preheat temperature.

2. A method as claimed in claim 1 wherein said relationship is simplified to $PF = (p+1)[\overline{A} - \overline{B}zw)/F - \overline{C}]$ in which $\overline{A}$, $\overline{B}$ and $\overline{C}$ are constants which change at infrequent intervals, $(p+1)$ is the number of moles of carbon burnt per atom of oxygen in the blast and $zw$ is the percent of zinc input lost in slag.

References Cited

UNITED STATES PATENTS

| 3,243,283 | 3/1966 | Lumsden | 75—77 |
| 3,407,060 | 10/1968 | Lumsden | 75—87 |

FOREIGN PATENTS

| 165,120 | 6/1954 | Australia. |
| 921,632 | 3/1963 | Great Britain. |

L. DEWAYNE RUTLEDGE, Primary Examiner

G. K. WHITE, Assistant Examiner

U.S. Cl. X.R.

235—151.1